3,177,215
PROCESS FOR THE PRODUCTION OF MELAMINE FROM HYDROGEN CYANIDE BY WAY OF CYANAMIDE
Robert W. Foreman, Chagrin Falls, and Franklin Veatch, Lyndhurst, Ohio, assignors to The Standard Oil Company, Cleveland, Ohio, a corporation of Ohio
Filed Dec. 28, 1961, Ser. No. 162,875
13 Claims. (Cl. 260—249.7)

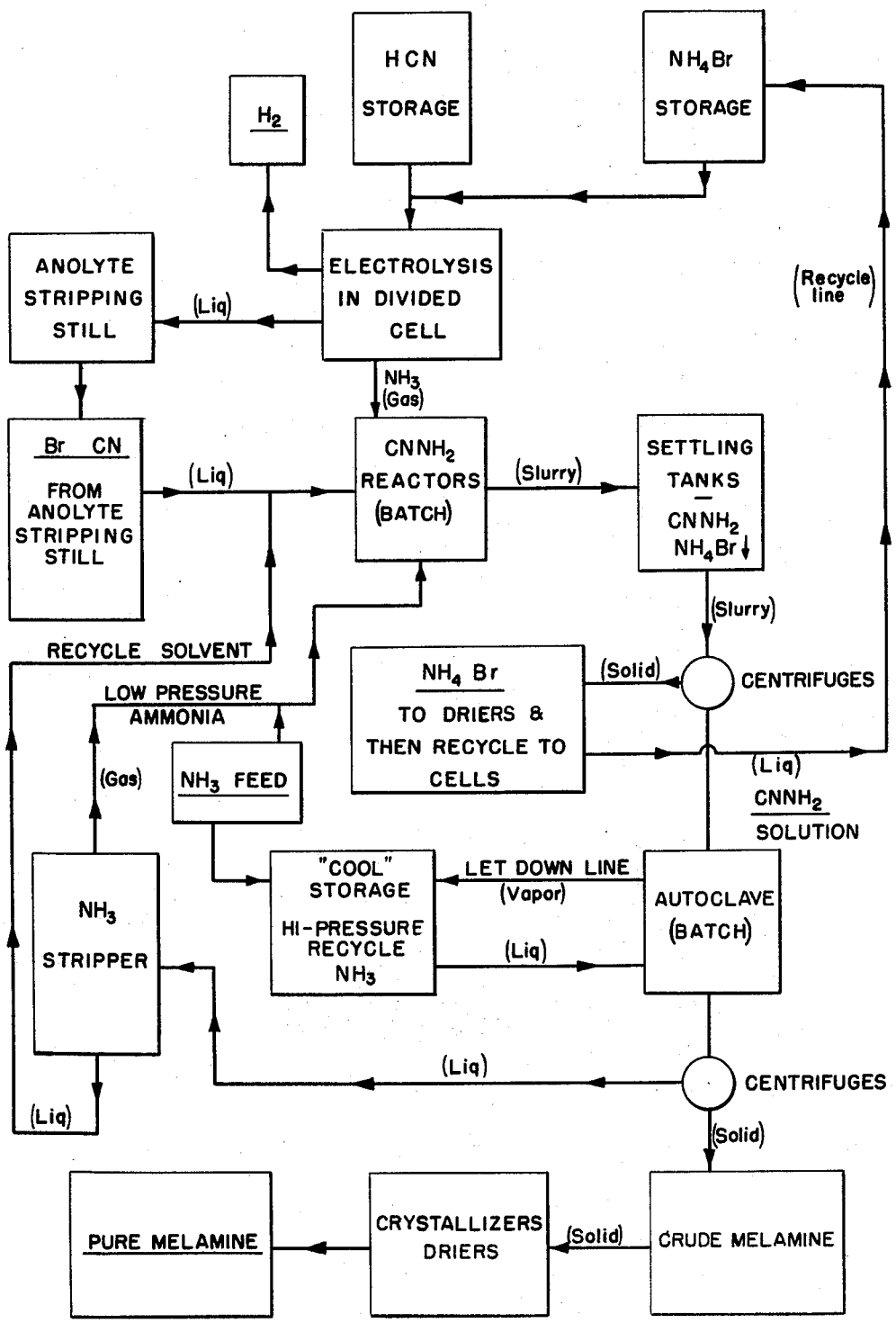

This invention relates to a process for the preparation of melamine by trimerization of cyanamide, and the cyanamide employed in such trimerization can be employed directly as obtained by ammonolysis of cyanogen halide, and, more particularly, the invention relates to a process for the combined ammonolysis of cyanogen halide to cyanamide and trimerization of cyanamide to melamine, in solution in the same solvent, and to a combination of these processes with the production of cyanogen halide from hydrogen cyanide.

It is possible to prepare melamine from hydrogen cyanide and ammonia stepwise by a combination of three processes, each the subject of application for U.S. Letters Patent, and involving the following reactions:

(1)
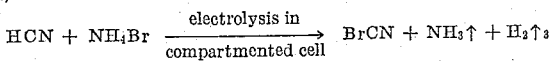

(2)
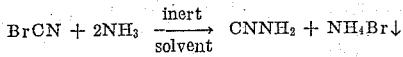

(3)
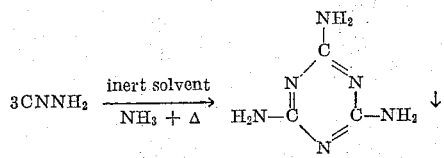

U.S. application Serial No. 95,479, filed March 14, 1961, now Patent No. 3,105,023, describes and claims the electrochemical reaction of hydrogen cyanide and ammonium halide to produce cyanogen halide.

Application Serial No. 137,524, filed September 12, 1961, describes and claims the ammonolysis of cyanogen halide in solution in an inert solvent, and application Serial No. 162,976, filed December 28, 1961, concurrently herewith, describes and claims the trimerization of cyanamide in solution in an inert solvent. In accordance with this invention, the ammonolysis and trimerization are carried out in succession in the same solvent, without isolation of the intermediate product, cyanamide, thereby obtaining melamine in higher yield and substantially without the formation of undesired by-products such as dicyandiamide.

Cyanogen chloride and ammonia have been reacted heretofore in ethyl ether, and this reaction is described in the Encyclopedia of Chemical Technology by Kirk and Othmer, vol. 4, page 671. However, reaction in this solvent is not capable of giving good yields of cyanamide, and consequently the process has not been adopted. Indeed, development has been directed towards nonsolvent processes which avoid problems of this type.

Melamine is ordinarily prepared from dicyandiamide with or without an inert solvent at elevated temperatures and pressures. However, the conversion to melamine is relatively low. Cyanamide will react under comparable conditions to produce melamine, but relatively large amounts of dicyandiamide are obtained, so that the yields are no better than those obtained from dicyandiamide, with the additional disadvantage that the melamine obtained must be separated from dicyandiamide.

In accordance with the instant invention, melamine is obtained by trimerization of cyanamide in the presence of sufficient ammonia to favor the production of melamine. Ammonia is not a reactant in the trimerization, and is not consumed, and can be recovered at the conclusion of the triberization for reuse.

FIGURE 1 represents, in the form of a flow sheet, one embodiment of the process of the invention, starting from hydrogen cyanide and ammonium bromide and continuing through the ammonolysis and trimerization reactions to the production of melamine. It will be understood that the cyanogen halide employed in the ammonolysis step can be obtained by any method other than the electrochemical conversion of hydrogen cyanide and ammonium halide, but the latter is employed as illustrative of a completed commercial process of extraordinary efficiency, both from the standpoint of yield and purity of the final product, melamine.

As shown in the flow sheet, hydrogen cyanide and ammonium halide are subjected to electrolysis in a compartmented cell. The cyanogen halide is formed in the anolyte and is recovered therefrom by stripping. Ammonia and hydrogen are also recovered, and the ammonia can be used in the ammonolysis reaction if desired. Further details of this process are found in application Serial No. 95,479, now Patent No. 3,105,023, the disclosure of which is herewith incorporated by reference. Cyanogen bromide in solution in any ether solvent of the invention is combined with ammonia in a reactor, with appropriate temperature control, and the resulting slurry of cyanamide solution and ammonium halide is dispatched to a settling tank for completion of the reaction and separation of ammonium halide. The slurry is pumped from the settling tank through a centrifuge, where the ammonium bromide is removed, dried, and then recycled to the electrolytic cell for conversion of a further amount of hydrogen cyanide. The liquid centrifugate containing cyanamide is passed, without further processing, to an autoclave or other pressure vessel, pressured with ammonia in the desired amount, and reacted at an elevated temperature until conversion to melamine is completed. The reaction mixture is then cooled after storage at room temperature for a sufficient period, and centrifuged to remove melamine which precipitates. The crude melamine that is recovered can be crystalized from water if desired and is then dried, whereupon it is ready for use or sale. The liquid centrifugate can be stripped of ammonia, concentrated or distilled, to separate the solvent from any residual solid material, and the solvent then recycled to dissolve a further proportion of cyanogen halide while the ammonia is recycled to the ammonolysis stage.

It is apparent from the flow sheet that these steps in combination result in a process for the conversion of hydrogen cyanide to melamine in which the only reactants used up are hydrogen cyanide and ammonia. The ammonium bromide which is obtained as a by-product of the ammonolysis is reused quantitatively in the electrolysis, and all of the cyanogen halide that is produced electrochemically is converted in the ammonolysis to cyanamide, which is in turn converted to melamine by trimerization. Yields upwards of 88% of melamine are obtainable, based on the hydrogen cyanide starting material.

The ammonolysis and trimerization reactions of the invention are carried out in the presence of an inert solvent which is a good solvent for cyanamide but a poor solvent for ammonium halide produced as a by-product in the ammonolysis step of the reaction, and for melamine produced as the end product in the trimerization step. It has been determined that one liter of the solvent should be capable of dissolving at least 50 grams and preferably at least 100 grams of cyanamide, and should be incapable of dissolving more than 5 grams of ammonium halide for effective operation of the process. Furthermore, the ammonium halide that separates from the solvent should be in the form of crystals that are easily handled, not only in recovering them from the cyanamide solution but also for reuse in the reaction with hydrogen cyanide.

The solvent further should be nonreactive with ammonia under the ammonolysis and trimerization conditions, a rather difficult requirement to meet in view of the high temperatures and pressures employed during trimerization. The solvent must also be nonreactive with cyanogen halide under the ammonolysis conditions.

The only solvents which have been found to meet all of these requirements are the polyoxyalkylene ethers and the cycloalkylene ethers having in the ring at least one ether oxygen group linked to the carbon atoms of the alkylene groups. These ethers should not have a hydrocarbon character, and it is therefore important that there be a large proportion of ether groups to carbon atoms, preferably at least one ether group for each five carbon atoms. The molecular weight is not critical, except that the ether should, of course, be a liquid under the reaction conditions, and should preferably have a high enough boiling point to make it possible to retain it in the liquid phase under the high temperatures applied during the trimerization step without application of unduly high pressures. The polyoxyalkylene ethers have at least two ether groups, linked by an alkylene group, and terminal alkyl groups are attached to the first and last ether groups in the chain. The cyclic ethers preferably have one or two ether oxygens in the ring.

Effective polyoxyalkylene ethers include dimethoxy ethane (dimethyl ethylene glycol), dimethyl triethylene glycol, dimethyl diethylene glycol, dimethyl tetraethylene glycol, diethyl diethylene glycol, dibutyl tripropylene glycol, dipropyl tetrabutylene glycol and dibutyl diethylene glycol. Typical cyclic ethers are dioxane, tetrahydrofuran, and tetrahydropyran.

THE AMMONOLYSIS REACTION

It is important that the reaction mixture contain a slight excess of ammonia, in order to obtain complete reaction of the cyanogen halide. Hence, the ammonia-to-cyanogen halide ratio should be at least 2. Ratios in excess of about 2.25 lead to undesirably large amounts of residual halide in the solution, and accordingly, the preferred range of ratios is from about 2 to 2.25.

The reaction temperature is not in any way critical, since the reaction is exothermic. In fact, unless the heat liberated can be conducted away from the reaction, the reaction rate may be slow. The amount of heat to be removed is rather large, approximately 56 kcal per mol. Therefore it may be desirable to cool the reactants to a very low temperature initially; the reaction will start at temperatures as low as —40° C. The optimum yields are obtained at reaction temperatures of from 0° C. to about 10° C., but temperatures as high as 80 to 100° C. can be used advantageously, under pressure to maintain the cyanogen halide in the liquid phase. Because the reaction is exothermic, it is rather rapid, and is complete in from 15 minutes to a few hours time. The reaction proceeds very rapidly at room temperature, and is complete in about 30 minutes.

The lower the reaction temperature, the more compact the deposit of ammonium halide crystals that is obtained and this type of deposit is advantageous because of easy filtration. At temperatures above or near the boiling point of the cyanogen halide used, about 60° C., in the case of cyanogen bromide, a large amount of the halide will appear in the vapor phase above the reaction mixture, and this may be undesirable because of the loss of cyanogen halide in undesired side reactions. This problem can be avoided by application of super-atmospheric pressure at such temperatures. If cyanamide is the desired end product, the reaction temperature should not be permitted to exceed 100° C., because of the possibility of other or side reactions.

The concentration of the reactants in the reaction solution can be widely varied. Good yields of cyanamide are obtainable at concentrations of cyanogen halide as low as about 0.01%. The maximum concentration is imposed only by the solubility of cyanogen halide in the solvent, i.e., up to a saturated solution, and it is also possible to disperse in the reaction mixture more cyanogen halide than can be dissolved therein initially, inasmuch as the cyanogen halide will dissolve as it is consumed in the reaction. The cyanogen halide concentration has no apparent effect upon the yield of cyanamide or ammonium halide.

The solvent employed should be substantially anhydrous, for optimum yields. Ammonium halide is extremely soluble in water, and the presence of large amounts of water can therefore lead to losses of this product, thus increasing the cost of operation. However, the reaction will proceed in the presence of water, and rather large amounts can frequently be tolerated, up to about 10% by weight of the solution.

It is usually preferable in carrying out the reaction to dissolve the cyanogen halide in the solvent, bring the solution to the reaction temperature and then admit ammonia gas or liquid ammonia at a rate sufficient to permit control of the reaction temperature within the desired range. The reaction system should be provided with a means for carrying off the heat liberated, such as refluxing beneath a condenser, or by cooling coils inserted within the reaction vessel, or by a cooling jacket enclosing the reaction vessel. The refluxing temperature can be lowered if the solvent has a higher boiling point than the desired reaction temperature, by including a sufficient amount of a compatible lower boiling solvent such as isopentane, pentane, and dimethyl ether. As the reaction proceeds, ammonium halide will separate out, and it will be desirable to agitate the system to maintain uniformity. After reaction is completed, usually in from 15 minutes to about 5 hours, the precipitated ammonium halide is removed, such as by filtration, decantation or centrifugation. If cyanamide is to be recovered, the reaction solvent is then separated by vacuum or atmospheric pressure distillation at a temperature below that at which the cyanamide will be dimerized to dicyandiamide, trimerized to melamine, or otherwise decomposed or polymerized.

The crude cyanamide solution that is recovered at the conclusion of the reaction contains principally cyanamide with small amounts of dicyandiamide and triazines such as ammeline and ammelide. At the higher reaction temperatures, a larger proportion of dicyandiamide and triazines are obtained. The cyanamide can be freed from such impurities by recrystallization from a solvent for cyanamide that is a nonsolvent for the higher polymers of cyanamide, such as a mixture of diethyl ether and benzene, or chloroform, or carbon disulfide.

In the commercial process for making melamine, wherein the cyanogen halide is obtained by the electrochemical reaction of hydrogen cyanide and ammonium halide in an electrolytic cell, such as is described in application Serial No. 95,479, now Patent No. 3,105,023, cyanogen halide feed from the cell anolyte stripping still is dissolved in the solvent employed in the process of this invention, and then subjected to ammonolysis as described above. The slurry that is obtained is pumped to settlors after the ammonia addition to complete both the reaction and crystallization of ammonium halide. The slurry is then pumped to centrifuges, where the ammonium halide is separated, washed and dried, and recycled to the reaction with hydrogen cyanide. The solvent containing cyanamide is then pumped into an autoclave, which is pressured with ammonia and brought to reaction temperature for trimerization to melamine.

THE TRIMERIZATION REACTION

The trimerization reaction is carried out at somewhat higher temperatures and therefore somewhat higher pressures than the ammonolysis. The temperature is at least 150° C. up to about 275° C., and preferably from 175° to 225° C. At too low a reaction temperature, below about 150° C., the formation of dicyandiamide is favored, despite the presence of ammonia. Temperatures above 275° C. can be used, provided the volatility of the solvent under these conditions is not so great that the pressures in the autoclave are excessive. Actually there is little reason to go above 275° C. or even 225° C., since nearly complete conversion to melamine is obtainable at this temperature or below, in reasonable reaction times of less than about one hour.

The time required for conversion of cyanamide to melamine in good yield will depend upon reaction temperature. The higher the temperature, the more rapid the conversion. In general, reaction times of from one-half hour to one hour are sufficient, although times of up to 10 hours can be used without disadvantage. However, there is certainly no point in continuing the reaction beyond the stage at which a satisfactory yield of melamine is obtained, inasmuch as any unreacted cyanamide or dicyandiamide in the reaction solution, after separation of melamine, can be reused for a further conversion.

The concentration of cyanamide in solution in the trimerization step is in no way critical, and will, of course, depend upon the amount of conversion obtained in the ammonolysis step. Usually, under the ammonolysis conditions set forth, conversions are obtained sufficient to produce a cyanamide concentration of from about 0.5 to about 25%.

The presence of ammonia is important in order to drive the reaction towards a more complete trimerization to melamine. In the absence of ammonia, the yield of dicyandiamide will be approximately equal to the yield of melamine, indicating that the dimerization and trimerization reactions proceed at approximately equal rates. Ammonia may increase the rate of trimerization, such that dicyandiamide is converted to melamine more or less as quickly as it is formed, and therefore is not present in a substantial amount in the reaction product.

The amount of ammonia required to obtain this beneficial result is rather small, and as little as 0.1 mol of ammonia to each mol of cyanamide is sufficient, but preferably the amount of ammonia is at least 0.5 mol per mol of cyanamide. There is no upper limit on ammonia concentration, and as much as 10 mols of ammonia per mol of cyanamide can be used. Since the ammonia is not consumed in the course of the reaction and can be recovered for reuse, as much ammonia can be used as is desired, but obviously there is no advantage in using more ammonia than is necessary to obtain a quantitative conversion of cyanamide to melamine.

At the conclusion of the trimerization, the crude melamine is separated from the reaction mixture by centrifugation, filtration or decantation, and the residual liquor or filtrate is then returned to the ammonolysis step for reuse, if the amount of dissolved material is negligible. If the reaction mixture contains a substantial quantity of dicyandiamide, the solvent solution can be concentrated, the solvent recovered being returned to the ammonolysis step, and the residue, a concentrated cyanamide solution, is then returned to the autoclave for a further passage through the trimerization reaction. The ammonia recovered is returned to the ammonolysis solution.

The crude melamine can be used as such or, if further purification is desirable, can be recrystallized from water.

The following examples, in the opinion of the inventors, represent the preferred embodiments of their invention:

Examples 1 to 8

In a 3-necked, round-bottom flask equipped with inlet tube, stirrer with a Teflon paddle, thermometer and an outlet tube connected through a bubble device, was placed 100 cc. of cyanogen bromide in dioxane. This solution contained 30 to 50 grams of cyanogen bromide. The vessel was tared, placed in a bed of Dry Ice and alcohol, and ammonia gas then admitted into the vapor phase above the reaction mixture at a slow enough rate so that all of it was absorbed by the reaction mixture as it was admitted, as evidenced by the absence of any gas escaping through the bubble device. The reaction temperature was held at from 2-15° C. by the addition of Dry Ice to the cooling bath as required. Periodically, the addition of ammonia was discontinued and the assembly weighed to determine the amount of ammonia that had been added. After enough ammonia had been absorbed to correspond to 2.2 moles of ammonia per mol of cyanogen bromide, addition of ammonia was halted, and the reaction mixture allowed to stand for one hour. During the course of the reaction the ammonium bromide precipitated, and upon completion of the reaction, had formed a deposit at the bottom of the vessel.

The reaction mixture was filtered under vacuum and the filter cake washed with three 20 ml. portions of dioxane. The solid ammonium bromide was then air-dried, for reuse in the reaction with hydrogen cyanide, while the filtrate and wash solutions were combined, and placed in a 1-liter Parr autoclave equipped with a stirrer. The reactor was pressured with an amount of ammonia equal to 0.5 mol for each mol of cyanamide present, and brought to the reaction temperatures noted in the table. The pressure at the reaction temperatures also is given in the table. The reaction time was 65–80 minutes. At the conclusion of the reaction time, the autoclave was quenched and depressured and the solid product, crude melamine, recovered by filtration. The crude product was recrystallized from water, and the yield of recrystallized material is reported in the table, based on the amount of cyanogen bromide employed as a starting material. The material insoluble in water was also recovered, and the amount noted. The insoluble material was identified as ammeline by infrared inspection, in accordance with the procedure outlined in the bulletin entitled "Melamine," page 24, published by American Cyanamid Company, Inc., February 1959.

The data taken in this series of runs appears in Table I:

TABLE I

| Example No. | Concentration of BrCN (percent) | Autoclave Temperature (° C.) | System Pressure (bars) | Melamine Yield (percent) | Insolubles (percent) |
|---|---|---|---|---|---|
| 1 | 30 | 165–181 | 38–43 | 75 | 0.08 |
| 2 | 30 | 181–190 | 42–46 | 91 | 0.82 |
| 3 | 50 | 139–199 | 16–21 | 89 | 3.46 |
| 4 | 50 | 167–182 | 18–22 | 73 | 5.56 |
| 5 | 30 | 171–181 | 27–29 | 84 | 1.20 |
| 6 | 30 | 182–193 | 28–31 | 89 | 0.21 |
| 7 | 50 | 170–181 | 35–42 | 83 | 0.63 |
| 8 | 50 | 185–194 | 43–48 | 82 | 0.37 |

The above results show that excellent yields of pure melamine are obtainable by this process.

Examples 9–12

A 25% solution of cyanogen bromide in dioxane (902 ml.) was ammonolyzed in accordance with the procedure outlined in Examples 1 to 8. A 77% yield of cyanamide was obtained. The resulting solution of cyanamide was employed in a series of trimerizations carried out with and without ammonia in order to show the effect of ammonia on the reaction. A variety of reaction temperatures and times were used, to facilitate the comparison. The following Table II sets forth the reaction temperatures, times, pressures and ammonia concentrations of these runs, as well as the yields of melamine and dicyandiamide obtained:

TABLE II

| Example No. | Temperature (° C.) | Time (Hr.) | System Pressure (bars) | Percent NH₃ | Material Balance | Yield (no loss) | |
|---|---|---|---|---|---|---|---|
| | | | | | | Melamine | Dicyandiamide |
| Control A | 191–193 | 0.25 | 67–73 | | 95 | 55 | 45 |
| Control B | 168–177 | 0.5 | 69–72 | | 95 | 49 | 51 |
| 9 | 188–193 | 0.5 | 69–72 | 19.5 | 97 | 80 | 20 |
| 10 | 191–193 | 0.5 | 42–48 | 11.9 | 91 | 83 | 17 |
| 11 | 177–182 | 1.0 | 60–71 | 16.9 | 93 | 73 | 27 |
| 12 | 213–218 | 1.0 | 56–58 | 11.5 | 80 | 97 | |

It is apparent from the above results that in the absence of ammonia, approximately equal amounts of melamine and dicyandiamide are obtained, whereas in the presence of ammonia, the amounts of dicyandiamide are insubstantial. The higher the reaction temperature, the greater the yield of melamine in proportion to dicyandiamide, and at reaction temperatures in excess of 200° C., substantially no dicyandiamide is obtained.

*Examples 13 and 14*

A comparison pair of runs was carried out under comparable reaction conditions, using cyanamide and cyanoguanidine in order to demonstrate the improved yield obtainable with the former. The cyanamide was obtained by ammonolysis of cyanogen bromide in dioxane, in accordance with the procedure of Examples 9 to 12. The dioxane solution of cyanamide was pressured with ammonia in an amount of 10 mols per mol of cyanamide, and brought to a temperature of 190° C., at which temperature the system pressure was 39 atmospheres. The concentration of cyanamide in this solution was 8.5% by volume. The reaction was conducted for one hour, and the melamine recovered by filtration. An 88% yield of crude melamine was obtained.

Cyanoguanidine was reacted in dioxane under exactly the same conditions but in the absence of ammonia. A 40% yield of crude melamine was obtained.

*Examples 15 to 17*

A series of runs were carried out at varying pressures and cyanogen bromide concentrations. Cyanogen bromide in the form of a 20 or 50% solution in dioxane was subjected to ammonolysis at a temperature of from 0 to 10° C. The cyanamide solutions obtained after separation of ammonium bromide by centrifuging were pressured with ammonia, and brought to a reaction temperature in the range from 190° to 200° C. The pressures under these conditions were entirely a function of the amount of ammonia present, and ranged from 13–59 atmospheres as noted in the table. The yields obtained also were dependent upon the amount of ammonia present, as the data show:

TABLE III

| Example No. | Percent CNBr | Pressure (atm.) of NH₃ | Melamine Yield (percent) |
|---|---|---|---|
| Control | 20 | 13 | 34 |
| 15 | 20 | 59 | 83 |
| 16 | 50 | 21 | 68 |
| 17 | 50 | 42 | 78 |

At an ammonia pressure of 13 atmospheres, the yield of melamine was only 34%, showing that this amount of ammonia was insufficient. At a pressure of 59 atmospheres and the same starting cyanogen bromide concentration, the yield was 83%. At 21 and 42 atmospheres, respectively, the melamine yields were 68 and 78%, respectively.

*Examples 18 to 20*

A series of runs was carried out at varying trimerization temperatures. The cyanamide solutions were prepared by ammonolysis of cyanogen bromide as a 20% solution in dimethoxyethane at a temperature of from 30 to 40° C. and an ammonia-to-cyanogen bromide ratio of 2:2.1. The ammonium bromide which precipitated during ammonolysis was removed by centrifuging, and the cyanogen bromide solution then trimerized directly in an autoclave, pressuring the system to 700–800 p.s.i.g. with ammonia. The ammonia-to-cyanamide molar ratio was 0.4:0.6 to 1. Three trimerizations were carried out, at the temperatures given in the table. The yield of melamine is given as crude crystals which separated from the reaction solution at the conclusion of the reaction.

TABLE IV

| Example No. | Temperature, ° C. | Percent Melamine Crystal from CNBr |
|---|---|---|
| 18 | 190–200 | 73 |
| 19 | 175–190 | 66 |
| 20 | 160–175 | 30 |

It is apparent from the data that a reaction temperature of 160–175° C. is too low for good yields. 190 to 200° C. and above are adequate reaction temperatures.

*Example 21*

300 ml. of a 30% solution of cyanogen bromide in tetrahydrofuran was placed in the reaction vessel described in Examples 1 to 8, and ammonia gas admitted to the space above the solution until 2.25 mols had been added. The reaction temperature was held at 0 to 10° C. over the three hour period required for addition of ammonia. The reaction mixture was allowed to stand for one hour at 10° C., after all of the ammonia had been added. 98% of the theoretical yield of ammonium bromide was recovered, and analysis of the solution indicated that 100% of the cyanogen bromide had been converted to cyanamide.

The tetrahydrofuran solution of cyanamide was put in an autoclave, and pressured up with ammonia gas, after which it was heated to 180° C. over a one hour period. It was held at from 180–190° C. for an additional hour and 20 minutes, during which time the average pressure was 90 atmospheres. The autoclave was then depressured, venting the ammonia to the atmosphere, and cooled to room temperature. The crude melamine which was separated was recovered by centrifuging, and recrystalized from water. An 88% yield of pure melamine, based on the weight of cyanogen bromide, was obtained. The residue from the crude melamine amounted to 0.5% of water-insoluble material, corresponding to higher cyanamide polymers. The mother liquor retained 2% melamine of 4% higher cyanamide polymers.

*Example 22*

Seventy-five ml. of a solution of cyanogen chloride in dioxane, containing 0.2 mole of cyanogen chloride, was added to a 500 ml. three-necked round bottom flask equipped with a thermometer, stirrer with a "Teflon" paddle, cold finger reflux condenser using a mixture of Dry Ice and acetone as the coolant and a gas entry port. Twenty-five ml. of dimethyl ether, a low boiling solvent for ammonia, were also added and 7.2 grams of ammonia were then added to the flask over a period of four minutes such that it could enter the reaction mixture from either vapor or reflux. The reaction mixture was maintained at the reflux temperature for 30 minutes and then stored at room temperature for one hour. A solid product later identified as ammonium chloride was observed to form. The reaction mixture was filtered and the liquid component was found to contain cyanamide. After filtration, the filter cake was washed with three 25 ml. portions of dioxane. The ammonium chloride yield was calculated as 97% of the theoretical amount.

The cyanamide solution in dioxane was then transferred to an autoclave, the temperature raised to 192–195° C., and ammonia gas was added. The pressure of ammonia gas was allowed to reach 700 p.s.i.g. The temperature was maintained for about two hours and the pressure was thereafter released, venting the ammonia to the atmosphere, after which the mixture was cooled to room temperature. The solid product obtained from the reaction mixture was identified as melamine, and the yield of crude product obtained was calculated as 93% of the theoretical.

*Example 23*

The procedure of Example 22 was repeated using as the cyanogen halide, 0.2 mole of cyanogen iodide. The by-product of the reaction was ammonium iodide, which was present in an amount of 96% of the theoretical. The final product was melamine, which was present in an amount of 92% of the theoretical.

This application is a continuation-in-part of application Serial No. 137,524, filed September 12, 1961.

We claim:
1. The process for the production of melamine from cyanogen halide and ammonia which comprises reacting the cyanogen halide with ammonia at a temperature at which the reaction to form cyanamide proceeds, within the range from about −40° C. up to about 100° C., in solution in an inert solvent cyanamide is soluble in an amount of at least 50 grams per liter and for cyanogen halide and cyanamide, in which solvent ammonium halide is soluble in an amount not in excess of about 5 grams per liter at the reaction temperature, separating ammonium halide which precipitates from the reaction mixture, trimerizing the cyanamide in the said solution at a temperature at which trimerization proceeds within the range from about 150° C. up to about 275° C. at a pressure sufficient to maintain the reaction mixture in the liquid phase in the presence of sufficient ammonia to favor the trimerization and minimize production of dicyandiamide, and recovering melamine from the reaction mixture.

2. A process in accordance with claim 1 in which the cyanogen halide is cyanogen bromide.

3. A process in accordance with claim 1 in which the inert solvent is a polyoxyalkylene ether having at least one ether oxygen for each five carbon atoms.

4. A process in accordance with claim 3 in which the polyoxyalkylene ether is dimethoxy ethane.

5. A process in accordance with claim 1 in which the inert solvent is a cyclic ether having an ether oxygen in the ring and at least one ether oxygen for each five carbon atoms.

6. A process in accordance with claim 5 in which the cyclic ether is dioxane.

7. A process in accordance with claim 5 in which the cyclic ether is tetrahydrofuran.

8. A process in accordance with claim 1 in which the ammonia is in an amount within the range from about 2 to about 2.25 mols per mol of cyanogen halide.

9. A process in accordance with claim 1 in which the reaction solution remaining after separation of melamine is recycled for reaction with cyanogen halide and ammonia in the ammonolysis step.

10. A process for the manufacture of melamine from hydrogen cyanide comprising subjecting a solution of hydrogen cyanide and an ammonium halide selected from the group consisting of ammonium bromide and ammonium chloride to the action of a direct electric current in an electrolytic cell, in which the cathode and anode compartments are divided by a permeable membrane, recovering cyanogen halide from the solution in the anode compartment, reacting the cyanogen halide with ammonia at a temperature at which the reaction to form cyanamide proceeds, within the range from about −40° C. up to about 100° C., in solution in an inert solvent cyanamide is soluble in an amount of at least 50 grams per liter and for cyanogen halide and cyanamide, in which solvent ammonium halide is soluble in an amount not in excess of about 5 grams per liter at the reaction temperature, separating ammonium halide which precipitates from the reaction mixture, trimerizing the cyanamide in the said solution at a temperature at which trimerization proceeds within the range from about 150° C. up to about 275° C. at a pressure sufficient to maintain the reaction mixture in the liquid phase in the presence of sufficient ammonia to favor the trimerization and minimize production of dicyandiamide, and recovering melamine from the reaction mixture.

11. A process in accordance with claim 10 in which the ammonium halide is ammonium bromide and the cyanogen halide is cyanogen bromide.

12. A process in accordance with claim 10 in which ammonium halide recovered from the ammonolysis reaction solution is recycled for reaction with hydrogen cyanide.

13. A process in accordance with claim 10 in which the solution remaining after recovery of melamine is recycled for reaction with cyanogen halide and ammonia in the ammonolysis step.

References Cited in the file of this patent

UNITED STATES PATENTS

| 2,265,824 | Thurston et al. | Dec. 9, 1941 |
| 2,575,629 | Klapproth | Nov. 20, 1951 |
| 3,105,023 | Foreman et al. | Sept. 24, 1963 |

FOREIGN PATENTS

| 466,957 | Great Britain | June 9, 1937 |
| 654,656 | Great Britain | June 27, 1951 |

OTHER REFERENCES

Cloez et al.: Annalen der Chemie, vol. 78, 1851, pages 228–231.

Traube: Ber d. Deut. Chem. Ges., vol. 18, 1885, pages 461–463.

Chemical Abstracts, vol. 52, columns 19639–19640 (1958).